Figure 1:
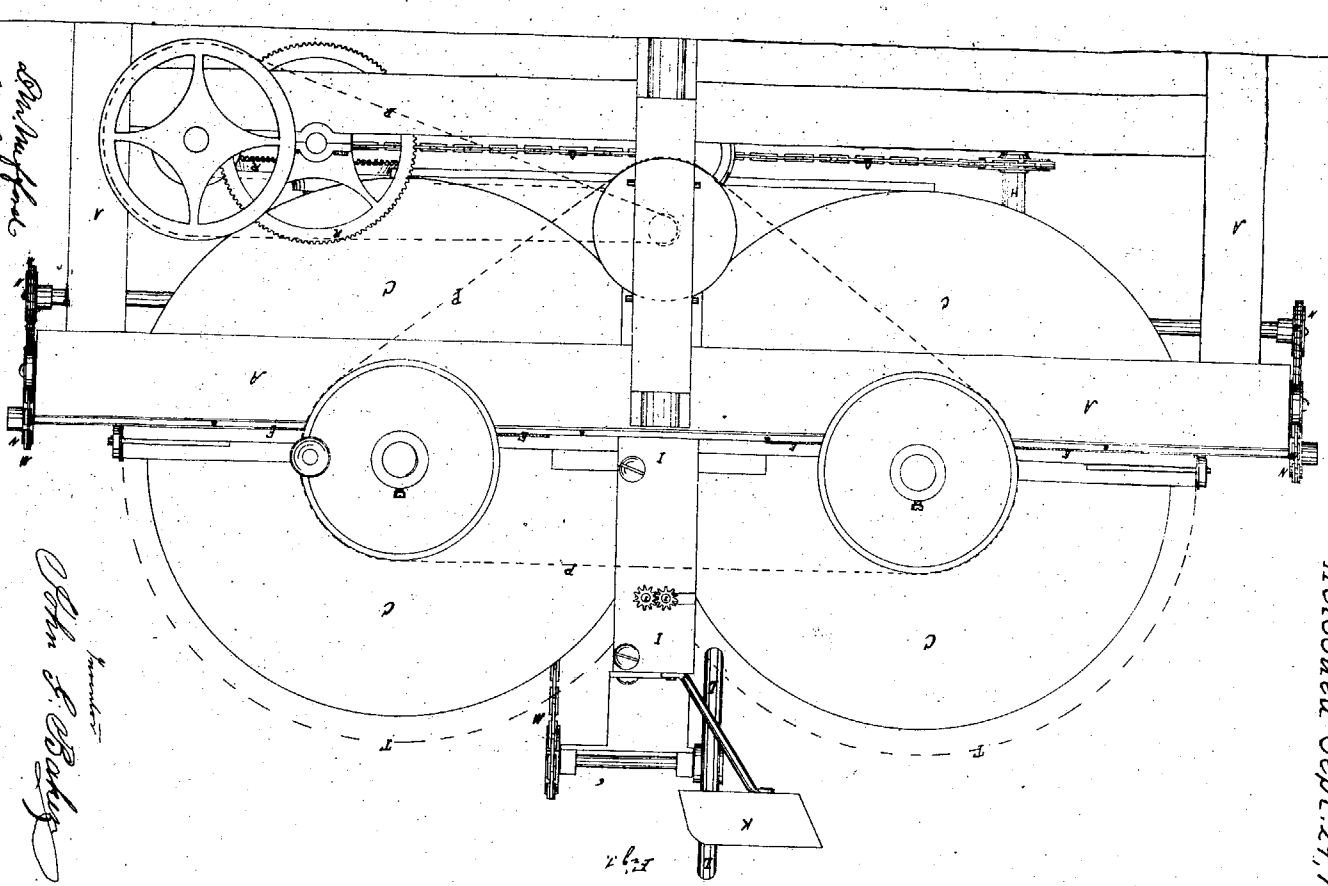

Sheet 1-8 Sheets

J. G. Baker.

Grinding Saws.

No. 3138

Reissued Sept. 29, 1868

Witnesses

D. W. Mufford

Jno. C. Clayton

Inventor

John G. Baker

Sheet-2-3 Sheets.
J. G. Baker.
Grinding Saws.
No. 3138. Reissued Sept. 29, 1868
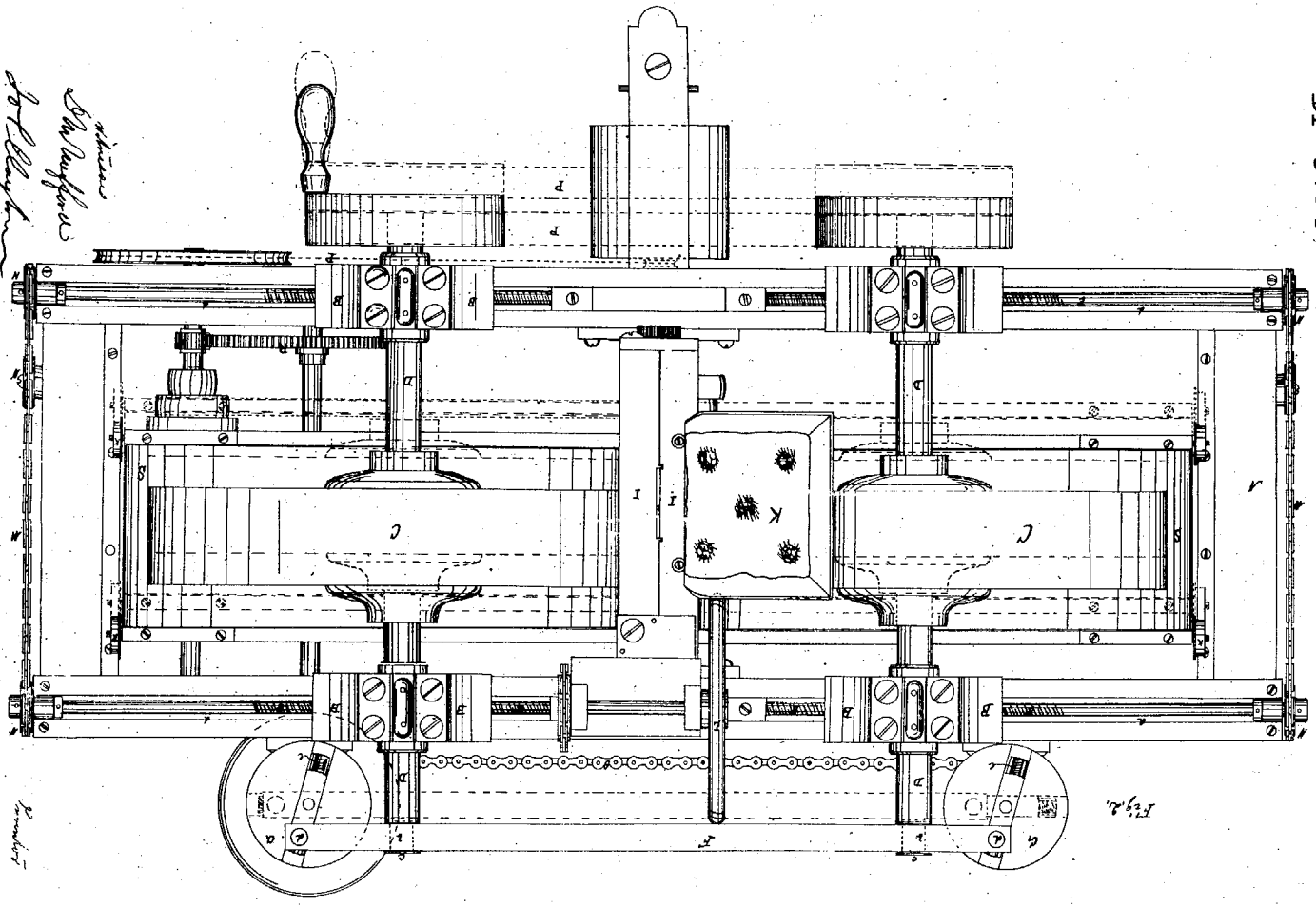
Witness
D. W. Rufford
Jos. Clayton
Inventor
John G. Baker Sheet 1-3 Sheets
J. G. Baker
Grinding Saws.
No. 3138
Reissued Sept. 29, 1868
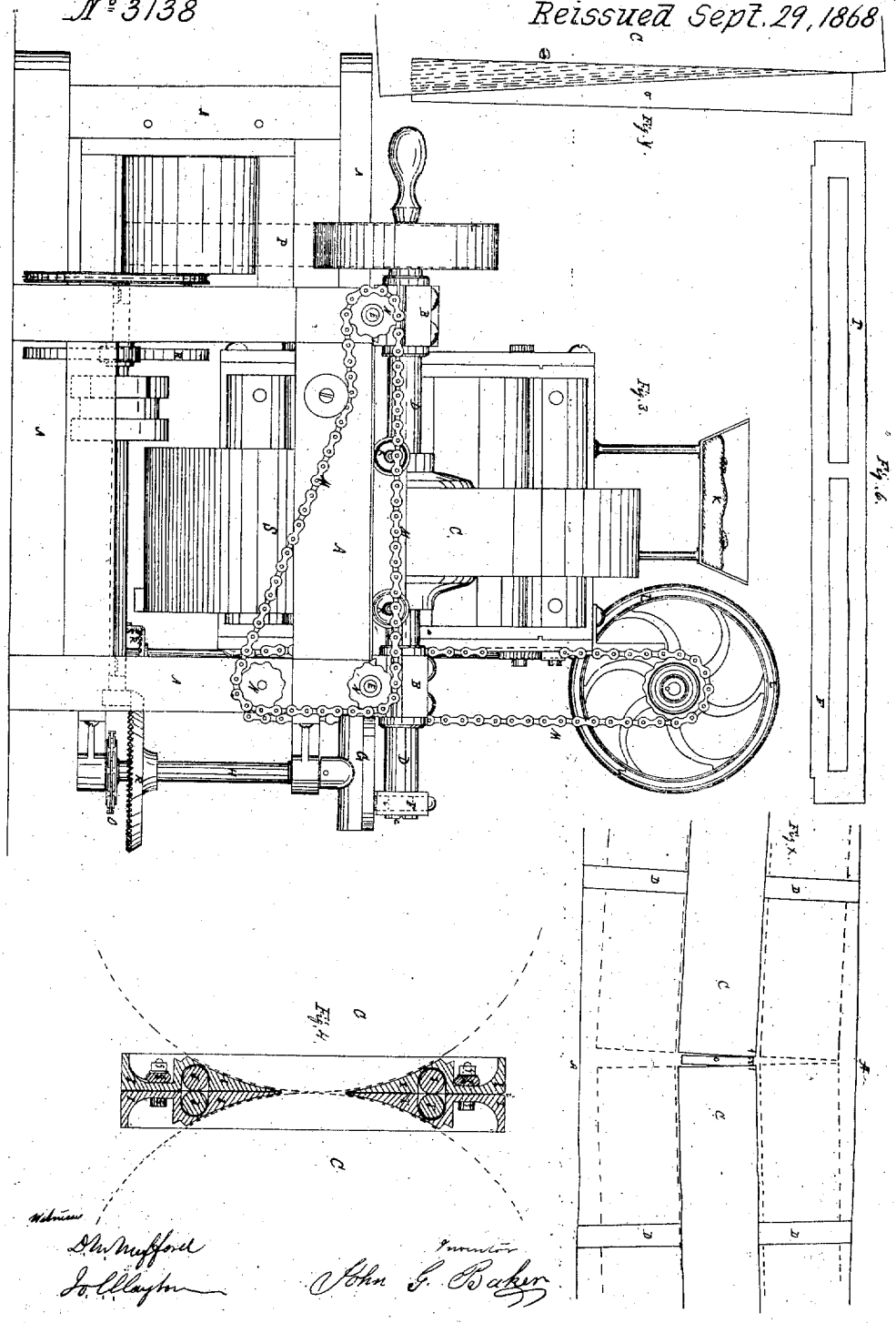
Witnesses
D. W. Mufford
D. Clayton
Inventor
John G. Baker

UNITED STATES PATENT OFFICE.

JOHN G. BAKER, OF PHILADELPHIA, PENNSYLVANIA.

IMPROVEMENT IN MACHINES FOR GRINDING SAWS.

Specification forming part of Letters Patent No. 41,419, dated January 22, 1864; Reissue No. 3,138, dated February 2, 1864; antedated January 22, 1864.

*To all whom it may concern:*

Be it known that I, JOHN G. BAKER, of Philadelphia, Pennsylvania, formerly of Washington city, in the District of Columbia, have invented certain new and useful Improvements in Machines for Grinding and Polishing Saws; and I do hereby declare the following is a full and exact description thereof, reference being had to the accompanying drawings, and to the letters of reference thereon marked.

In the several figures similar characters refer to like parts.

Figure 1 is a side elevation. Fig. 2 is a plan view. Fig. 3 is an end elevation. Fig. 4 is a vertical section showing the feed-rollers. Fig. 5 shows the slotted traverse bar; Figs. *x* and *y*, diagrams in illustration of my invention.

The caps which cover the grindstones are omitted from the drawings in order that other portions of the machine may be represented more clearly.

The nature of my invention consists in mechanism, fully described hereinafter, for grinding and polishing the blades of hand saws and other thin plates of metal.

In order to enable others to make and use my invention, I will describe its construction and operation, reference being had to the accompanying drawings, which form a part of this specification, and in which—

A is a substantial rectangular frame, along the upper edges of which are grooved ways *a*, and upon the latter the four plumber-blocks B are arranged to slide.

C C are the grinding or polishing stones, which may be of any suitable substance or size. Each of these stones is secured to an axle, D, the bearings of which are in the sliding plumber-blocks B. These axles extend beyond their journals to a sufficient extent to receive the devices, which give them both a revolving and lateral reciprocating motion.

E E E E are four screws, having right and left handed threads, and so arranged to turn in the grooves of the ways *a*, and to so operate the plumber-blocks as to make the stones approach each other at the desired angle to which they are adjusted in the first instance.

F is a slotted traverse-bar, in the slots of which the necks *b* (see Fig. 2) of the axles D are held by collars *c*, the ends of the bar being pivoted to the pins *d* of the extension-cranks G G, secured to the upper ends of the vertical shafts H, which turn in bracket journal-boxes projecting from the frame-work, the throw of the cranks being regulated by the set-screws *e*.

I is a vertical double rectangular frame secured to the frame A, and is so constructed and arranged (see Fig. 4) as to be between the two stones, except at a short central space, where the curved faces of the stones (see red lines, Fig. 4) are nearly in contact with each other. The two halves of this frame are secured together by means of the bolts *f*, which are provided with rubber springs *g*. J J are two pairs of feed-rollers, having their bearings in the opposite halves of the frame I, the springs *g* tending to force the feed-rollers toward each other, so that the saw to be ground or polished will be held firmly between and fed downward by them.

K is the seat for the operative who feeds the saws into the slit *i*, between the two halves of the frame I, by pushing them downward until they are seized by the upper feed-rollers.

L is the operating-wheel for controlling the stones and making them approach or retire from each other, as may be needed in the different stages of the grinding or polishing process, a suitable system of endless chains, M, and chain-pulleys, N, connecting the wheel L to the four right and left handed screws E, and an endless chain, O, and chain-pulleys on the lower ends of the vertical shafts H insure the simultaneous movement of the expansion-cranks G.

The machine is operated by a suitable system of belts, P, and gearing R.

S is the casing or trough for holding the water, and this casing in which the stones revolve extends the whole length of the machine, and is supported upon small wheels *k* at each end, which roll upon ways on the ends of the frame A. The casing thus traverses with the stones.

T are the casing-caps. (Shown in the drawings only by dotted lines, Fig. 1.)

It is well known that a good handsaw should be so ground as to be thinner on the back than on the cutting edge, and that it should have a uniform taper from the edge to the back. Unless the saw is thus ground it will be necessary to give a large degree of "set" to its teeth, in order that it may cut freely and without "buckling."

The mode in common use of grinding saw-blades is to fasten them to a board, which a skilled workman holds by his knees against a grindstone, and with dexterity acquired by experience moves the blade until it is finished, an operation both tedious and expensive and more or less imperfect in its results. Many devices have been designed for this purpose, but none have proven satisfactory.

In the building of my machine the plumber-blocks are cast hollow and fitted to their ways, the right and left handed screws, endless chains, pulleys, and wheel L being so arranged as to operate the plumber-blocks uniformly and simultaneously. The axles are then applied to the plumber-blocks and Babbitt metal is run around them. By this arrangement the stones are kept constantly at the desired angle, and as they wear away by use they can be brought nearer to each other, still preserving the same angle, until the stones are worn down to a size too small for use.

Operation: Power being properly applied, the operative inserts the end of a saw-blade in the slit *i* between the two halves of the frame I, pushing it down until seized by the highest feed-rollers, which carry it down between the stones. It is these feed-rollers which, controlling the saw-blade, constitute the main feature of my invention.

It is true that feed rollers have been used in combination with a grindstone or polishing-wheel, as in J. A. Hendricks's patent of February 1, 1859, in which, however, the blade is fed across the periphery of the grindstone by rollers turning on axes arranged at right angles to that of the stone, the blade being controlled partly by the rollers and partly by a stop which prevents the blade being carried round by the stone. In my machine, however, the blade is under the control of the rollers, the axis of which are parallel or nearly so with those of the stones, so that the blade is reduced by longitudinal instead of transverse grinding, as in Hendricks's machine.

It should be here understood that the feed-rollers may be used in combination with a single grindstone; for instance, one of the stones in the drawings may be supposed to be a simple disk turning loosely in bearings and bearing against one side of the blade while the opposite side is being acted on by the stone. I prefer, however, the plan illustrated in the drawings of using two stones revolving in contrary directions, as shown in the machine, which is illustrated in the drawings, and the operation of which I will now proceed to describe more minutely.

As the blade is carried downward by the rollers, both sides are ground simultaneously. At the same time a transverse reciprocating motion is imparted to the stones by the expansion-cranks G and the slotted bar F, the latter, as before described, being connected to the axles of the stones.

Fig. X is a diagram showing the operation of the stones, which are here shown at an exaggerated angle, *o* being the blade, and the red and dotted lines indicating the opposite extremes of the traverse motion.

When the stones first commenced grinding the blade, their edges *i i* first come in contact with it at its edges 2 2, so that if there was no traversing across the saw the stones themselves would soon be worn away to a bevel, and succeeding saws would be ground straight; but this disadvantage is entirely overcome by the transverse traversing of the entire faces of both stones past the edges 2 2 of the saw, the said faces thus retaining their initial relative angle.

After a number of blades have been operated on by the machine the attendant gives the wheel L a very slight turn, so as to bring the stones somewhat nearer together. The blades are then again subjected to the machine as before, and this process is repeated a sufficient number of times to reduce the blade to the desired finish preparatory to grinding.

Fig. Y is a magnified view of a blade in section with exaggerated taper, the dotted lines indicating the successive angular portions ground off at the several passages of the saw through the machine.

Having thus freely described the construction and operation of my invention, what I claim as new, and desire to secure by Letters Patent, is—

1. The combination, with a grindstone or grindstones, of feed-rollers J, the axis of which are parallel or nearly so with those of the stones.

2. Two grindstones arranged at an angle in respect to each other, and having traversing motion imparted to them, all substantially as and for the purpose herein set forth.

3. The combination of the expansion-cranks G with the slotted traverse-bar F.

4. The combination of the feed-rollers with the frame I.

5. The frame I, made in two halves and carrying the feed-rollers J, in combination with the springs *g*, or their equivalents.

In testimony whereof I have signed my name to this specification before two subscribing witnesses.

JOHN G. BAKER.

Witnesses:
H. HOWSON,
JOHN WHITE.